United States Patent [19]
Blumenthal et al.

[11] Patent Number: 6,001,910
[45] Date of Patent: Dec. 14, 1999

[54] USE OF ANIONIC OR CATIONIC PLASTICIZERS WITH SULFONATED POLYESTERS IN HOT MELT FORMULATIONS

[75] Inventors: Mitchell J. Blumenthal, Belle Mead; Charles W. Paul, Madison; Matthew L. Sharak, Franklin Park, all of N.J.

[73] Assignee: National Starch and Chemical Investment Holding Corporation, Wilmington, Del.

[21] Appl. No.: 09/289,451

[22] Filed: Apr. 9, 1999

[51] Int. Cl.$^6$ .............. C08L 91/06; C08F 20/00
[52] U.S. Cl. .......... 524/277; 528/272; 528/288; 528/291; 528/295; 528/296; 528/298; 528/300; 528/301; 528/302; 528/303; 528/306; 528/307; 528/308; 528/308.6; 528/310; 528/335; 528/350; 528/361; 525/426; 525/437; 525/445; 525/447; 525/450; 524/77; 524/81; 524/155; 524/270; 524/284; 524/297; 524/313; 524/602; 524/604; 524/605; 524/608; 156/441.5
[58] Field of Search ........................ 528/272, 288, 528/291, 295, 296, 298, 300, 301, 302, 303, 306, 307, 308, 308.6, 310, 335, 350, 361; 525/437, 426, 445, 447, 450; 524/77, 81, 155, 270, 277, 284, 297, 313, 602, 604, 605, 608; 156/441.5

[56] References Cited

U.S. PATENT DOCUMENTS

| | | | |
|---|---|---|---|
| 4,052,368 | 10/1977 | Larson | 260/75 S |
| 4,073,777 | 2/1978 | O'Neill et al. | 260/75 S |
| 4,233,196 | 11/1980 | Sublett | 260/29.2 N |
| 4,257,928 | 3/1981 | Vachon et al. | 260/33.4 R |
| 4,304,901 | 12/1981 | O'Neill et al. | 528/290 |
| 4,525,524 | 6/1985 | Tung et al. | 524/601 |
| 4,575,525 | 3/1986 | Wacome et al. | 524/48 |
| 4,598,142 | 7/1986 | Hilbert et al. | 528/295 |
| 4,678,824 | 7/1987 | Lauria | 524/48 |
| 4,735,843 | 4/1988 | Noda | 428/137 |
| 4,910,292 | 3/1990 | Blount | 528/272 |
| 4,973,656 | 11/1990 | Blount | 528/272 |
| 4,990,593 | 2/1991 | Blount | 528/272 |
| 5,098,962 | 3/1992 | Bozich | 525/437 |
| 5,296,535 | 3/1994 | Nesiewicz et al. | 524/446 |
| 5,356,963 | 10/1994 | Kauffman et al. | 524/43 |
| 5,360,845 | 11/1994 | Billmers et al. | 524/51 |
| 5,382,652 | 1/1995 | Fukuda et al. | 528/308.6 |
| 5,387,623 | 2/1995 | Ryan et al. | 523/124 |
| 5,532,306 | 7/1996 | Kauffman et al. | 524/274 |
| 5,543,488 | 8/1996 | Miller et al. | 528/277 |
| 5,552,411 | 9/1996 | Downing et al. | 514/312 |
| 5,552,495 | 9/1996 | Miller et al. | 525/437 |
| 5,571,876 | 11/1996 | Miller et al. | 525/437 |
| 5,574,076 | 11/1996 | Sharak et al. | 523/128 |
| 5,583,187 | 12/1996 | Sharak et al. | 525/438 |
| 5,605,764 | 2/1997 | Miller et al. | 428/480 |
| 5,718,790 | 2/1998 | Miller et al. | 156/155 |
| 5,750,605 | 5/1998 | Blumenthal et al. | 524/230 |

FOREIGN PATENT DOCUMENTS

| | | |
|---|---|---|
| WO 95/05413 | 2/1995 | WIPO . |
| WO 95/18191 | 7/1995 | WIPO . |
| WO 96/07540 | 3/1996 | WIPO . |

*Primary Examiner*—Samuel A. Acquah
*Attorney, Agent, or Firm*—Lydia T. McNally; Ellen T. Dec

[57] ABSTRACT

A remoistenable hot melt adhesive composition comprising
(i) 25 to 80% by weight of a sulfonated polyester;
(ii) 3 to 40% by weight of an anionic or cationic plasticizer;
(iii) 0 to 40% by weight of a polar tackifier;
(iv) 0 to 3% by weight of an antioxidant; and
(v) 10 to 35% by weight of a polar wax; and
(vi) optionally 0 to 30% nonionic plasticizer, wherein the total of (i)–(vi) to equal 100% by weight.

23 Claims, No Drawings

USE OF ANIONIC OR CATIONIC PLASTICIZERS WITH SULFONATED POLYESTERS IN HOT MELT FORMULATIONS

BACKGROUND OF THE INVENTION

This invention relates to remoistenable hot melt adhesive compositions having superior non-blocking properties at high temperature and high humidity.

Remoistenable adhesives are commonly used in the production of envelopes, stamps, wallpaper, tapes, labels and similar products wherein it is desirable to provide a dry adhesive film which on being moistened with water will become tacky and thereby allow for the ready adhesion to a chosen substrate. In the manufacture of remoistenable adhesive products, typically an aqueous solution or dispersion, or an organic solvent solution of the dry adhesive is applied as a wet film to a substrate. After the water or organic solvent is removed by drying and evaporation, the resulting dry adhesive film will, on being moistened, produce the desired tacky adhesive surface.

In addition to remoistenability, another desirable property for these applications is non-block. Blocking is an undesirable phenomenon which occurs when the coated substrate, such as the envelopes, are stored in stacks, and exposed to varying degrees of humidity, resulting in the tendency of adjacent surfaces of the stacked substrates to adhere to one another.

Hot melt adhesives are used commercially for a wide variety of applications. The major advantage of hot melt adhesive systems is the lack of a carrier fluid which eliminates the need for drying the adhesive film once it is applied to the substrate. This elimination of the drying step overcomes hazards associated with solvent usage and also allows for faster production line speeds and lower transportation costs.

Hot melt adhesives have historically been based on petroleum derived polymers such as polyethylene, ethylene-vinyl acetate, styrenic block copolymers, polypropylene, and vinyl pyrrolidone polymers including vinyl acetatelvinyl pyrrolidone copolymers. All these adhesive compositions are further tackified, plasticized and/or reinforced with a variety of resins, oils and/or waxes which are derived from both petroleum and naturally occurring feedstocks such as wood, gum and tall oil rosin and terpenes.

Hot melt formulations based on ethylene vinyl acetate base polymers have humidity blocking resistance, but are moisture insensitive, i.e., they do not become tacky when exposed to moisture.

Sulfonated polyesters, when used as the base polymer in hot melt adhesives, become tacky when exposed to moisture. U.S. Pat. No. 5,750,605 discloses that the incorporation of specific crystalline wax materials into hot melt adhesive compositions containing certain sulfonated polyesters has the unexpected advantage of improving both the heat resistance as well as the adhesive strength thereof. Such adhesives find particular use in paper-bonding applications where their water dispersibility facilities repulping of adhesively bonded paper products.

It has been found in accordance with the present invention, that the use of an anionic or cationic plasticizer in conjunction with sulfonated polyesters provides both excellent remoistenability and excellent humidity blocking resistance, while maintaining water dispersibility.

SUMMARY OF THE INVENTION

We have now found that a hot melt adhesive with remoistenability and humidity blocking resistance can be prepared by the use of cationic or anionic plasticizers with sulfonated polyester and polar wax. Thus, the present invention is directed to remoistenable hot melt formulations comprising: (a) 25 to 80% sulfonated polyesters; (b) 10 to 35% polar waxes; (c) 3 to 40% anionic or cationic plasticizer; (d) 0 to 40% polar tackifier; (e) 0 to 3% antioxidant; and, optionally, (f) 0 to 30% of a nonionic plasticizer. All %'s are percent by weight.

DETAILED DESCRIPTION OF THE INVENTION

The present invention is directed to remoistenable hot melt formulations comprising: (a) 25 to 80% sulfonated polyesters; (b) 10 to 35% polar waxes; (c) 3 to 40% anionic or cationic plasticizer; (d) 0 to 40% polar tackifier; (e) 0 to 3% antioxidant; and, optionally, (f) 0 to 30 % a nonionic plasticizer.

The major component of the adhesive of the invention, present in an amount of 25 to 80% by weight, preferably 30 to 75% by weight, of the adhesive, comprises a sulfonated polyester condensation polymer comprising the reaction product of:

a) at least one difunctional dicarboxylic acid or corresponding methyl ester which is not a sulphomonomer;

b) 2 to 25 mole percent of at least one sulphomonomer containing at least one metallic sulfonate group or nitrogen-containing non-metallic sulfonate group attached to an aromatic or cycloaliphatic nucleus and at least one functional group selected from the group consisting of hydroxyl, carboxyl, and amino;

c) at least one difunctional reactant selected from a glycol or a mixture of a glycol and diamine having two —NRH groups, the glycol containing two —C($R^1$)$_2$—OH groups wherein R in the reactant is hydrogen or an alkyl group of 1 to 6 carbon atoms, and $R^1$ in the reactant is a hydrogen atom, an alkyl of 1 to 5 carbon atoms, or an aryl group of 6 to 10 carbons atoms;

d) 0 to 40 mole percent of a difunctional reactant selected from hydroxycarboxylic acids having one —C(R)$_2$—OH group, aminocarboxylic acids having one —NRH group, amino-alcohols having one —C(R)$_2$—OH group and one —NRH group, or mixtures of said difunctional reactants wherein R in the reactant is hydrogen or an alkyl group of 1 to 6 carbon atoms; and e) 0 to 40 mole percent of a multifunctional reactant containing at least three functional groups selected from hydroxyl, carboxyl, and mixtures thereof wherein at least a portion of the multifunctional reactant contains at least three hydroxyl groups, wherein all stated mole percentages are based on the total of all acid, hydroxyl and amino group containing reactants being equal to 200 mole percent, and wherein the polymer contains proportions of acid-group containing reactants (100 mole percent acid) to hydroxy- and amino-group containing reactants (100 mole percent base) such that the value of (equivalents) EQ (base) divided by (equivalents) EQ (acid) is between 0.5 and 2.

The difunctional acid or ester reactant of (a) of the composition of the present invention is preferably substantially aliphatic in nature and may be an acid selected from the group consisting of oxalic; malonic; dimethylmalonic; succinic; glutaric; adipic; trimethyladipic; pimelic; pivalic; fumaric; maleic; dodecanoic; 2,2-dimethylglutaric; azelaic; sebacic; 1,3-cyclopentanedicarboxylic; 1,2-cyclohexanedicarboxylic; 1,3-cyclohexane dicarboxylic; 1,4-cyclo-hexanedicarboxylic; phthalic; terephthalic; isophthalic; 2,5-norbomane-dicarboxylic; 1,3-naphthalic; diphenic; 4,4'-oxydibenzoic; diglycolic; thiodipropionic; 4,4'-sulfonyldibenzoic; and 2,5-naphthalenedicarboxylic acids and esters thereof and mixtures thereof. The difunctional dicarboxylic acid or ester reactant of (a) is preferably selected from the group of acids consisting of isophthalic acid, terephthalic acid, phthalic anhydride (acid), adipic acid, pivalic acid, dodecanedioic acid, sebacic acid, azelaic acid, 1,4-cyclohexanedicarboxylic acid, 1,3-cyclohexanedicarboxylic acid, maleic anhydride, fumaric acid, succinic anhydride (acid), 2,6-naphthalenedicarboxylic acid, and glutaric acid and esters thereof and mixtures thereof. The more preferred difunctional dicarboxylic acid reactants of (a) are selected from the group consisting of isophthalic acid, adipic acid, 1,4-cyclohexanedicarboxylic acid, 1,3-cyclohexanedicarboxylic acid and mixtures thereof with 1,4-cyclohexanedicarboxylic acid being most preferred.

The sulphomonomer reactant of (b) is preferably selected from the group consisting of difunctional monomers containing a —$SO_3M$ group attached to a nucleus selected from the group consisting of benzene, naphthalene, anthracene, diphenyl, oxydiphenyl, sulfonyldiphenyl, and methylenediphenyl, wherein M is Na+, Li+, Mg++, Ca++, Fe++, and Fe+++. The more preferred sulfomonomer reactant of (b) is selected from the group consisting of diols an diol adducts of multifunctional reactant containing at least three hydroxyl groups and a monocarboxylic acid sulfomonomer containing at least one metallic sulfonate group or nitrogen-containing non-metallic sulfonate group attached to an aromatic or cyclo-aliphatic nucleus. Alternatively, a more preferred group of sulfomonomers include 5-sodiosulfoisophthalic acid, dimethyl 5-sodiosulfoisophthalate, 5-lithiosulfoisphthalic acid, and bis(2-hydroxyethyl)-5-sodiosulfoisophthalate; with the 5-sodiosulfoisophthalic acid or dimethyl 5-sodiosulfoisophthalate being most preferred.

The difunctional reactant of (c) is preferably a diol selected from the group consisting of ethylene glycol; propylene glycol, 1,3-propanediol, 2-methyl-1,3-propanediol, 2,4-dimethyl-2-ethyl-hexane-1,3-diol, 2,2-dimethyl-1,3-propanediol (neopentyl glycol), 2-ethyl-2-butyl-1,3-propanediol (neopentyl glycol), 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, 2,2,4-trimethyl-1,6-hexanediol, thiodiethanol, 1,2-cyclohexanedimethanol, 1,3-cyclohexanedimethanol, 1,4-cyclohexanedimethanol, 2,2,4,4-tetramethyl-1,3-cyclobutanediol, p-xylylenediol, diethylene glycol, triethylene glycol, tetraethylene glycol, pentaethylene glycol, hexaethylene glycol, heptaethylene glycol, octaethylene glycol, nonaethylene glycol, decaethylene glycols, 2,2,4-trimethyl-1-1,3-pentanediol, hydroxypivalyl hydroxypivalate, dipropylene glycol, 1,10-decanediol, hydrogenated bisphenol A, and mixtures thereof. The difunctional reactant of (c) is more preferably selected from the group consisting of diethylene glycol; neopentyl glycol, cyclohexanedimethanol, 2-ethyl-2-butyl-1,3-propanediol, 2,2,4-trimethyl-1,3-pentanediol, hydroxypivalyl hydroxypivalate, and 2-methyl-1,3-propanediol, with diethylene glycol, neopentyl glycol, and cyclohexanedimethanol being most preferred.

Advantageous difunctional components which are aminoalcohols include aromatic, aliphatic, heterocyclic and other types as in regard to component (d). Specific examples include 5-aminomethylcyclohexanemethanol; 5-amino-2-ethyl-pentanol-1, 2-(4-b-hydroxyethoxyphenyl)-1-aminoethane, 3-amino-2,2-dimethyl-propanol, hydroxyethylamine, etc. Generally these aminoalcohols contain from 2 to 20 carbon atoms, one —NRH group and one —$C(R)_2$—OH group.

Advantageous difunctional monomer components which are aminocarboxylic acids include aromatic aliphatic, heterocylic, and other types as in regard to component (d) and include lactams. Specific examples include 6-aminocaproic acid, its lactam known as caprolactam, omega-aminoundecanoic acid, 3-amino-2-dimethylpropionic acid, 4-(b-aminoethyl)-benzoic acid, 2-(b-aminopropoxy) benzoic acid, 4-aminomethlcyclohexanecarboxylic acid, 2-(b-aminopropoxy) cyclohexanecarboxylic acid, etc. Generally these compounds contain from 2 to 20 carbon atoms.

Advantageous examples of difunctional monomer component (d) which are diamines include ethylene-diamine; hexamethylenediamine; 2,2,4-trimethylhexamethylenediamine; 4-oxaheptane-1,7-diamine; 4,7-dioxadecane-1,10-diamine; 1,4-cyclohexanebismethylamine; 1,3-cycloheptamethylenediamine; dodeca-methylenediamine, etc.

Reactant (e), when used, preferably contains 3 to 6 hydroxyl and/or carboxyl groups; more preferred is trimethylolpropane (TMP), trimethylolethane (TME), glycerine, pentaerythritol, arytritol, threitol, dipentaerythritol, sorbitol, trimellitic anhydride, pyromellitic dianhydride, or dimethylolpropionic acid, with TMP being most preferred. It is preferred that reactant (e) be present in a minor amount up to 40 mole percent, more preferred 0 to 20 mole percent.

The polyester composition used as a component of the hot melt adhesives of the present invention preferably comprises 60 to 100 mole percent of (a), 4 to 20 mole percent of (b), 80 to 100 mole percent of (c), 0 to 10 mole percent of (d), and 0 to 20 mole percent of (e).

In other more preferred embodiments of the invention the polyester comprises 60 to 100 mole percent of 1,4-cyclohexanedicarboxylic acid; 4 to 20 mole percent of 5-sodiosulfoisophthalic acid or dimethyl 5-sodiosulfoisophthalate; and 80 to 100 mole percent of diethylene glycol, neopentyl glycol or cyclohexanedimethanol.

The preparation of the polyesters used herein is generally described, for example, in U.S. Pat. Nos. 4,910,292, 4,973, 656, and 4,990,593.

The preferred polycondensation reactant conditions for the preparation of the polyester are at a temperature of 150 to 230° C. in the presence of a catalyst. The catalyst for the polycondensation reaction is preferably an acid catalyst more preferably an organo-metallic compound, such as a tin or titanium containing compound. Suitable examples of the acid catalyst include dibutyltinoxide, stannous oxalate, titaniumtetraisopropoxide, butylstannoic acid, and p-toluenesulfonic acid, with butylstannoic acid being most preferred. A preferred butylstannoic acid catalytic amount is 0 to 0.5 weight percent, based on the total weight of reactants, preferably 0.01 to 0.2 weight percent, with 0.1 weight percent being most preferred. The viscosity of the polyester is preferably between 1000cP and 1,000,000cP at 350° F., most preferably between 5000 and 60,000 cP. Viscosity is measured in a Brookfield viscometer using a #27 spindle. Viscosity is generally related to molecular weight with higher viscosities corresponding to higher molecular weights.

The hot melt adhesives of the invention also comprise polar wax materials, at levels of 10 to about 35% by weight, to reduce the melt viscosity while improving heat resistance.

The waxes used must be highly polar, containing $\geq 3 \times 10^{-3}$ equiv/g of polar groups and at least one group per molecule and with a molecular weight below 500 g/mole. Higher concentrations of polar groups are necessary for higher molecular weight waxes. These polar groups include hydroxyl, amide (primary, secondary, and tertiary), sulfone, phosphate esters, sulfonamide, carbonate, urea, amine, urethane, carboxylic acid; and carboxylate salts, ureas, and sulfonate salts.

Suitable crystalline polar waxes include 12-hydroxystearamide, N-(2-hydroxy ethyl) 12-hydroxystearamide (PARICIN 220 from CasChem), stearamide (KEMAMIDE S from Witco), glycerin monostearate, sorbitan monostearate, and 12-hydroxy stearic acid. Also useful in combination with the above are the less polar waxes such as N,N'-ethylene-bis-stearamide (KEMAMIDE W40 from Witco), hydrogenated castor oil (castor wax), oxidized synthetic waxes, and functionalized synthetic waxes such as oxidized polyethylene waxes (PETROLITE E-1040). These less polar waxes are optionally present in amounts up to 10% by weight.

Among the applicable stabilizers or antioxidants which may be included herein are high molecular weight hindered phenols and multifunctional phenols such as sulfur and phosphorous-containing phenols. Representative hindered phenols include: 1,3,5-trimethyl-2,4,6-tris(3,5-di-tert-butyl-4-hydroxyphenyl) propionate; n-octadecyl 3,5-di-tert-butyl-4-hydroxyphenyl) propionate; 4,4'-methlenebis (2,6-di-tert-butylphenol); 4,4'-thiobis (6-tert-butyl-o-cresol); 2,6-di-tert-butylphenol; 6-(4-hydroxyphenoxy)-2,4-bis(n-octylthio)-1, 3,5-triazine; di-n-octadecyl-3,5-di-tert-butyl-4-hydroxy-benzylphosphonate; 2-(n-octylthio)-ethyl 3,5-di-tert-butyl-4-hydroxy-benzoate; and sorbitol hexa[3-(3,5-di-tert-butyl-4-hydroxyphenyl)propionate]. If used, the stabilizer is present in levels of about 0.1 to 3% by weight.

The hot melt adhesives of the present invention also comprise 3 to 40% of anionic or cationic plasticizers which are available in either solid or liquid form. Examples of anionic plasticizers include the sulfosuccinate salts, such as sodium dioctyl sulfosuccinate, a solid plasticizer available under the tradename CYTEC OT-100 from Cytec Industries; sulfated fatty acids such as AHCOWET RS from ICI; and EMULSIFIER K-30, a solid alkane sulfonate available from Bayer Inc.

Examples of cationic plasticizers include the fatty amine quaternary ammonium salts, such as ATLAS G-265 with HLB of 33, available from ICI; and ATLAS-G-3634A an imidazoline quaternary ammonium salt, also available from ICI.

The cationic or anionic plasticizer is a critical ingredient in order for the hot melt adhesive to have higher levels of dispersibility, and to unexpectedly have both remoistenability and blocking resistance, which are contradictory properties.

The tackifying resins, present in an amount of 0 to 40% by weight, are generally polar in nature and have a Ring and Ball softening point greater than 60° C. and include rosin and rosin derivatives, terpene phenolics, pure phenolic resins, and the like. More particularly, the useful tackifying resins include any compatible resins or mixtures thereof such as (1) natural and modified rosins such, for example, as gum rosin, wood rosin, tall oil rosin, distilled rosin, hydrogenated rosin, dimerized rosin, and polymerized rosin; (2) rosin esters such as glycerol and pentaerythritol esters of natural and modified rosins, such, for example as the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin; and (3) phenolic modified (a) terpene or (b) a-methyl styrene resins as well as the hydrogenated derivatives thereof such, for example, as the resin product resulting from the condensation, in an acidic medium of a bicyclic terpene and a phenol. Mixtures of two or more of the above described tackifying resins, as well as blends of the above resins with small amounts of (e.g., less than about 20% of the adhesive) less compatible resins may be utilized for some formulations.

Representative polar tackifiers include ionic materials such as FORAL NC available from Hercules; non-ionic materials such as FORAL AX also from Hercules; alpha methyl styrene phenolics such as URATAK 68520 from DSM Resins; rosin esters such as UNITAC R100L available from Union Camp; and, terpene phenolics such as NIREZ 300, available from Arizona Chemical.

Another tackifier is sucrose benzoate which is particularly useful due to its biodegradable and compostable character. Sucrose benzoate is preferably utilized in its alcohol soluble form wherein the sucrose is partially esterified. This grade is a light colored, clear non-crystalline solid with a softening point of about 95° C. Alternatively, the non-alcohol organic soluble grade, a water-clear, non-crystalline flake solid having a softening point of 98° C. may also be used. Both grades are available commercially from Velsicol Chemical Corporation.

High polarity hydroxyl-containing tackifiers are most preferred. Among these are styrene allyl alcohol copolymers available from ARCO Chemical under the tradename SAA-100, and orthophthalate neopentyl glycol polyester polyol available from Stepan under the tradename Stepanol PN-110.

The most preferred tackifiers are styrene allyl alcohol copolymers and ortho phthalate-neopentyl glycol polyester polyol, which do not hinder the water dispersibility of the adhesive.

Depending on the end-use application, various compatible nonionic liquid plasticizers or extending oils may optionally be present in the composition. Preferred compatible plasticizers are non-crystalline in nature and include polar liquid plasticizers including phthalate plasticizers such as dioctyl phthalate and butyl benzyl phthalate (e.g., SANTICIZER 160 from Monsanto); liquid polyesters (non-crystalline) such as DYNACOL 720 from Huls and the liquid polymeric plasticizer available from C. P. Hall; benzoate plasticizers such as 1,4-cyclohexane dimethanol dibenzoate (e.g., BENZOFLEX 352 available commercially from Velsicol), diethylene glycol/dipropylene glycol dibenzoate (e.g., BENZOFLEX 50 from Velsicol) and diethylene glycol dibenzoate where the mole fraction of hydroxyl groups which have been esterified ranges from 0.5 to 0.95 (e.g., BENZOFLEX 2-45 HIGH HYDROXYL also from Velsicol); phosphate plasticizers such as t-butylphenyl diphenyl phosphate (e.g., SANTICIZER 154 available commercially from Monsanto); poly (ethylene glycol) with molecular weight below about 1000 and derivatives of poly(ethylene glycol) (e.g., PYCAL 94, the phenyl ether of PEG, available commercially from ICI); ethoxylated bis phenol A (e.g., MACOL 206 EM from PPG Industries); dinonyl phenol ethyoxylates (e.g., SURFONIC DNP 100 from Huntsman Chemical Corp.); liquid rosin derivatives having Ring and Ball melting points below about 60° C. such as the methyl ester of hydrogenated rosin (e.g., HERCOLYN D from Hercules); as well as vegetable and animal oils such as glycerol esters of fatty acids and polymerization products thereof. Particularly preferred plasticizer include phenyl ether of polyethylene-glycol; butyl benzyl phthalate; benzoates such as 1,4-cyclohexane dimethanol dibenzoate, diethylene glycol/dipropylene glycol dibenzoate, and diethylene glycol dibenzoate where the mole fraction of hydroxyl groups which have been esterified ranges from 0.5 to 0.95. These plasticizers are also polar in chemical composition and show improved compatibility over plasticizers which are not polar such as Mineral Oil.

It will be recognized that the end use application will greatly affect the choice of plasticizing diluent with adhesives which require biodegradability using plasticizers such as benzoates, phthalates, liquid polyesters as well as vegetable and animal oils. Applications where water dispersibility is more essential will benefit from the use of polyethylene glycol or water soluble ethoxylated alcohols (e.g., PYCAL 94) as the plasticizing component.

There may also be present small amounts (i.e., less than about 10%) of non-polar plasticizing diluents such as mineral oil and polybutene. The most preferred nonionic polar plasticizer is PLASTHALL BH-1, a polyester adipate plasticizer from CP Hall Inc.

Optional additives may be incorporated into the hot melt compositions in order to modify certain properties thereof. Among these additives may be included colorants such as titanium dioxide; and fillers such as talc and clay, etc.

The hot melt adhesive compositions of the invention may be formulated using techniques known in the art. An exemplary procedure involves placing approximately 40% of the total tackifying resin concentration with all the polymer, wax, plasticizers and stabilizers in a jacketed mixing kettle, preferably in a jacketed heavy duty mixer, which is equipped with rotors and thereupon raising the temperature to a range of from up to about 190° C., preferably below 165° C. After the resin has melted, the temperature is lowered to 150° to 165° C. Mixing and heating are continued until a smooth, homogeneous mass is obtained whereupon the remainder of the tackifying resin is thoroughly and uniformly admixed therewith.

As noted above, the sulfonated polyester containing hydrophilic hot melt adhesives of the invention will be formulated differently depending upon the particular end use. Specifically, hot melt adhesives for various end uses are described below.

The remoistenable adhesive of the present invention find particular use in the production of envelopes, stamps, wallpaper, tapes, labels and similar products wherein it is desirable to provide a dry adhesive film which on being moistened with water will become tacky and thereby allow for the ready adhesion to a chosen substrate. The adhesives also find use in tissue lamination.

The following examples are illustrative only and are not intended to limit the scope of the present invention in any manner.

EXAMPLES

The Following Test Procedures Were used in the Examples:

In preparing the following samples, a heavy duty mixer which had been heated to 165° C. and which was equipped with a stirring paddle was charged with 40% of the tackifying resin and/or diluent. After melting of the resins, stirring was then initiated whereupon the polyester was added slowly at 165° C. over a one-half hour period after which the temperature was lowered to 150° C. Heating and stirring were continued until a homogeneous mass was obtained whereupon the remainder of the tackifying resin and/or diluent was admixed therewith.

The samples were tested using the following procedures:
Remoistenability

This procedure is used to determine whether a remoistenable hot melt adhesive, after initial application, gave adequate bonding when remoistened and mated to a particular substrate. A sample was heated to its application temperature (in this case between 250 to 300° F.) and applied to the paper substrate using a 0.5 to 1.0 mil metal draw down bar. The adhesive was allowed to cool and the paper was cut into ½" strips. The adhesive was then conditioned at ambient temperature and 50% humidity for 2 hours. The strips were moistened with room temperature tap water. Each strip was then pressed onto a second piece of paper substrate using the same amount of pressure as if closing an envelope. When the coatings were pulled from the paper, the percent fiber tear was recorded. Approximately 50% or more being excellent, good between 10% rated fiber tear to 40%, and <10% fiber tear of the total bond as poor.

Humidity Blocking Resistance

This procedure was used to determine the blocking resistance of the remoistenable hot melts under pressure, heat, and/or humidity. A film of approximately 0.5 mil thickness was drawn down onto an 8½"×11" paper stock. The adhesive specimen was cut into squares of 1"×1" and the adhesive specimen square was placed adhesive side down onto a piece of uncoated paper stock. The combination was placed between a glass plate and a sponge with the weight of the glass being at least 500 g. The entire assemble was placed in a humidity salt chamber at various measure humidities, in this case 75%, 81% and 85% RH (relative humidity). After 24 hours, the samples were removed from the coated paper stock. The degree of fiber tear or adhesive picking of the fibers was then recorded and each sample was rated on a scale of 1 to 3. A value of 1 being excellent, or "clean" with no fiber tear of slight picking, 2 is fair/passing with picking but NO fiber tear, and 3 is failing with fiber tear or fiber pick.

Pressure Blocking Resistance: 120° F. for 24 hours

This procedure was used to determine the blocking resistance of the remoistenable hot melts under pressure and no humidity. A film of approximately 0.5 mil thickness was drawn down onto an 8½"×11" paper stock. The adhesive was cut into 1"×1" squares, and three squares are placed atop each other onto a piece of uncoated paper stock. A force of 1 psi was placed atop the three squares, which were placed in a forced air oven at 120° F. for 24 hours. After 24 hours, the coatings were removed from the oven and peeled apart, and evaluated on a scale of 1–3. A rating of 1 implies no blocking, and that was a pass. A rating of 2 implies slight clinging with no fiber tear or pull, and is considered a marginal pass. A rating of 3 implies fiber tear observed as a result of the blocking, and thus is deemed a failure.

Water Dispersibility

The percent water dispersibility was determined using the TAPPI UM 666 test procedure. The test results showed improved performance as a potential remoistenable hot melt using the anionic or cationic surfactants over the polar non-ionic plasticizer.

The following were used in the formulations:

EASTMAN AQ 1350 is a branched sulfonated polyester available from Eastman Chemical.

PARICIN 220 is a 12-hydroxystearamide wax from CasChem Inc.

SANTOVAR is a 2,5-di(tert-amyl) hydroquinone antioxidant from Monsanto.

TNPP is a tris nonylphenyl phosphite antioxidant from GE Inc.

EXAMPLE I

Hot Melt Formulations Comprising Cationic Plasticizers with Sulfonated Polyesters Remoistenable hot melt adhesive formulations were prepared using sulfonated polyester EASTMAN AQ 1350, a branched sulfonated polyester available from Eastman Chemical.

The following formulations, shown in Table I, were evaluated for viscosity, remoistenability, humidity blocking at various humidity levels, pressure blocking and dispersibility. The results are reported in Table II.

Sample 1 is a control which does not contain any cationic or anionic plasticizer, however it does comprise a the optional polar plasticizer, PLASTHALL BH-1, which is a polyester adipate nonionic plasticizer from CP Hall Inc.

Samples 2 and 3, which are according to the present invention, comprise an anionic plasticizer, EMULSIFIER K-30 (Sample 2) and a cationic plasticizer, Atlas G-265 (Sample 3).

TABLE I

| | (% by weight) | | |
|---|---|---|---|
| | 1 | 2 | 3 |
| EASTMAN AQ 1350 | 52 | 52 | 52 |
| Styrene Allyl Alcohol | 15 | 15 | 15 |
| PARICIN 220 | 20 | 20 | 20 |
| PLASTHALL BH-1 | 13 | 0 | 0 |
| EMULSIFIER K-30 | 0 | 13 | 0 |
| Atlas G-265 | 0 | 0 | 13 |
| SANTOVAR A | 0.5 | 0.5 | 0.5 |
| TNPP | 0.5 | 0.5 | 0.5 |

TABLE II

| Physical Properties | 1 | 2 | 3 |
|---|---|---|---|
| Viscosity 275° F. | 2000 | 4175 | 1200 |
| Pressure Blocking Resistance: 120° F., 24 hour @ 1 psi | 2 | 1 | 1 |
| Remoistenability | Poor Fiber Tear | Fiber Tear | Fiber Tear |
| Humidity Blocking Resistance: | | | |
| 75% RH | 2 | 1 | 1 |
| 81% RH | 2 | 1 | 1 |
| 85% RH | 3 | 1 | 2 |
| % Dispersibility | 95 | 97 | 97 |

The results in Table II indicate, that Samples 2 and 3 show improved pressure blocking resistance, remoistenability and humidity blocking when compared with Sample 1, the control, with no sacrifice in water dispersibility. In the table, "RH" refers to relative humidity.

We claim:

1. A hot melt adhesive composition comprising
   (i) 25 to 80% by weight of a sulfonated polyester condensation polymer comprising the reaction product of
      a) at least one difunctional dicarboxylic acid or the corresponding methyl esters which is not a sulphomonomer;
      b) 2 to 25 mole percent of at least one sulfomonomer containing at least one metallic sulfonate group or nitrogen-containing non-metallic sulfonate group attached to an aromatic or cycloaliphatic nucleus and at least one functional group selected from the group consisting of hydroxyl, carboxyl, and amino;
      c) at least one difunctional reactant selected from a glycol or a mixture of a glycol and diamine having two —NRH groups, the glycol containing two —C(R$^1$)$_2$—OH groups wherein R in the reactant is hydrogen or an alkyl group of 1 to 6 carbon atoms, and R$^1$ in the reactant is a hydrogen atom, an alkyl of 1 to 5 carbon atoms, or an aryl group of 6 to 10 carbons atoms;
      d) 0 to 40 mole percent of a difunctional reactant selected from hydroxycarboxylic acids having one —C(R)$_2$—OH group, aminocarboxylic acids having one —NRH group, amino-alcohols having one —C(R)$_2$—OH group and one —NRH group, or mixtures of said difunctional reactants wherein R in the reactant is hydrogen or an alkyl group of 1 to 6 carbon atoms; and
      e) 0 to 40 mole percent of a multifunctional reactant containing at least three functional groups selected from hydroxyl, carboxyl, and mixtures thereof wherein at least a portion of the multifunctional reactant contains at least three hydroxyl groups,
   wherein all stated mole percentages are based on the total of all acid, hydroxyl and amino group containing reactants being equal to 200 mole percent, and wherein the polymer contains proportions of acid-group containing reactants (100 mole percent acid) to hydroxy- and amino-group containing reactants (100 mole percent base) such that the value of the equivalents of base divided by the equivalents of acid is between 0.5 and 2;
   (ii) 3 to 40% by weight of an anionic or cationic plasticizer;
   (iii) 0 to 40% by weight of a polar tackifier;
   (iv) 0 to 3% by weight of an antioxidant;
   (v) 10 to 35% by weight of a compatible wax diluent, with a molecular weight below 500 g/mole containing at least one polar functional group, said group being present at a concentration greater than 3×10$^{-3}$ equivalents per gram; and
   (vi) optionally 0 to 30% nonionic plasticizer, wherein the total of (i)–(vi) to equal 100% by weight.

2. The hot melt adhesive of claim 1 wherein the cationic plasticizer is selected from the group consisting of fatty amine quaternary ammonium salts and imidazoline quaternary ammonium salts.

3. The hot melt adhesive of claim 1 wherein the anionic plasticizer is selected from the group consisting of sodium dioctyl sulfosuccinate, alkane sulfonate, and sulfated fatty acid.

4. The hot melt adhesive of claim 1 wherein the difunctional acid or ester reactant of (a) of the sulfonated polyester is an acid selected from the group consisting of oxalic; malonic; maleic; furmaric; pivalic; dodecanoic; dimethylmalonic; succinic; glutaric; adipic; trimethyladipic; pimelic; 2,2-dimethylglutaric; azelaic; sebacic; 1,3-cyclopentanedicarboxylic; 1,2-cyclohexanedicarboxylic; 1,3-cyclohexane dicarboxylic; 1,4-cyclohexanedicarboxylic; phthalic; terephthalic; isophthalic; 2,5-norbornanedicarboxylic; 1,3-naphthalic; diphenic; 4,4'-oxydibenzoic; diglycolic; thiodipropionic; 4,4'-sulfonyldibenzoic; and 2,5-naphthalenedicarboxylic acids and esters thereof and mixtures thereof.

5. The hot melt adhesive of claim 4 wherein the difunctional dicarboxylic acid or ester reactant of (a) is selected from the group of acids consisting of isophthalic acid, terephthalic acid, phthalic anhydride (acid), adipic acid, pivalic acid, dodecanedioic acid, sebacic acid, azelaic acid, 1,4-cyclohexanedicarboxylic acid, 1,3-cyclohexanedicarboxylic acid, maleic anhydride, fumaric acid, succinic anhydride (acid), 2,5-naphthalenedicarboxylic acid, and glutaric acid and esters thereof and mixtures thereof.

6. The hot melt adhesive of claim 5 wherein the difunctional dicarboxylic acid reactant is selected from the group consisting of isophthalic acid, adipic acid, 1,4-cyclohexanedicarboxylic acid, 1,3-cyclohexanedicarboxylic acid and mixtures thereof.

7. The hot melt adhesive of claim 1 wherein the sulfomonomer reactant of (b) of the sulfonated polyester is selected from the group consisting of difunctional monomers containing a —$SO_3M$ group attached to a nucleus selected from the group consisting of benzene, naphthalene, anthracene, diphenyl, oxydiphenyl, sulfonyidiphenyl, and methylenediphenyl, wherein M is $Na+$, $Li+$, $Mg++$, $Ca++$, $Fe++$, and $Fe+++$.

8. The hot melt adhesive of claim 7 wherein the sulfomonomer reactant is selected from the group consisting of diols and diol adducts of multifunctional reactant containing at least three hydroxyl groups and a monocarboxylic acid sulfomonomer containing at least one metallic sulfonate group or nitrogen-containing non-metallic sulfonate group attached to an aromatic or cyclo-aliphatic nucleus.

9. The hot melt adhesive of claim 7 wherein the sulfomonomer is selected for the group consisting of 5-sodiosulfoisophthalic acid, dimethyl 5-sodiosulfoisophthalate, 5-lithiosulfoisphthalic acid, and bis(2-hydroxyethyl)-5-sodiosulfoisophthalate.

10. The hot melt adhesive of claim 1 wherein the difunctional reactant of (c) is a diol selected from the group consisting of ethylene glycol; propylene glycol; 1,3-propanediol; 2-methyl-1,3-propanediol; 2,4-dimethyl-2-ethyl-hexane-1,3-diol; 2,2-dimethyl-1,3-propanediol; 2-ethyl-2-butyl-1,3-propanediol; 2-ethyl-2-butyl-1,3-propanediol; 2-ethyl-2-isobutyl-1,3-propanediol; 1,3-butanediol; 1,4-butanediol; 1,5-pentanediol; 1,6-hexanediol; 2,2,4-trimethyl-1,6-hexanediol; thiodiethanol; 1,2-cyclohexanedimethanol; 1,3-cyclohexanedimethanol; 1,4-cyclohexane-dimethanol; 2,2,4,4-tetramethyl 1,3-cyclobutanediol; p-xylylenediol; diethylene glycol; triethylene glycol; tetraethylene glycol; pentaethylene glycol; hexaethylene glycol; heptaethylene glycol; octaethylene glycol; nonaethylene glycol; decaethylene glycols; 2,2,4-trimethyl-1-1,3-pentanediol; hydroxypivalyl hydroxypivalate; dipropylene glycol; 1,10-decanediol; hydrogenated bisphenol A; and mixtures thereof.

11. The hot melt adhesive of claim 10 wherein the difunctional reactant is selected from the group consisting of diethylene glycol; triethyleneglycol; neopentyl glycol, cyclohexanedimethanol, 2-ethyl-2-butyl-1,3-propanediol, 2,2,4-tri methyl-1,3-pentanediol, hydroxypivalyl hydroxypivalate, and 2-methyl-1,3-propanediol.

12. The hot melt adhesive of claim 1 wherein the difunctional component (d) of the sulfonated polyester is an aminoalcohol selected from the group consisting of 5-aminomethyl-cyclohexanemethanol 5-amino-2-ethyl-pentanol-1; 2-(4-b-hydroxyethoxyphenyl)-1-aminoethane, 3-amino-2,2-dimethyl-propanol and hydroxyethylamine.

13. The hot melt adhesive of claim 1 wherein the difunctional monomer components of (d) of the sulfonated polyester is an aminocarboxylic acids selected from the group consisting of 6-aminocaproic acid, as caprolactam, omega-aminoundecanoic acid, 3-amino-2-dimethylpropionic acid, 4-(b-aminoethyl)-benzoic acid, 2-(b-aminopropoxy) benzoic acid, 4-aminomethlcyclohexanecarboxylic acid, and 2-(b-aminopropoxy) cyclohexane-carboxylic acid.

14. The hot melt adhesive of claim 1 wherein the difunctional monomer of (c) of the sulfonated polyester is a diamine selected from the group consisting of ethylenediamine; hexamethylenediamine; 2,2,4-trimethyl-hexamethylenediamine; 4-oxaheptane-1,7-diamine; 4,7-dioxadecane-1,10-diamine; 1,4-cyclohexane-bismethylamine; 1,3-cycloheptamethylene-diamine; and dodecamethylene-diamine.

15. The hot melt adhesive of claim 1 wherein the multifunctional reactant of the sulfonated polyester is selected from this group consisting of trimethylolpropane, trimethylolethane, glycerine, pentaerythritol, arytritol, threitol, dipentaerythritol, sorbitol, trimellitic anhydride, pyromellitic dianhydride, and dimethylolpropionic acid.

16. The hot melt adhesive of claim 1 wherein the sulfonated polyester comprises 60 to 100 mole percent of (a), 4 to 20 mole percent of (b), 80 to 100 mole percent of (c), 0 to 10 mole percent of (d), and 0 to 20 mole percent of (e).

17. The hot melt adhesive of claim 1 wherein the tackifying resin is a polar resin having a Ring and Ball softening point greater than 60° C. and selected from the group consisting of (1) natural and modified rosins; (2) sucrose benzoate; (3) phenolic modified terpene and a-methyl styrene resins and hydrogenated derivatives thereof; and (4) rosin esters.

18. The hot melt adhesive of claim 1 wherein the tackifier is styrene allyl alcohol.

19. The hot melt adhesive of claim 1 wherein the crystalline polar wax diluent is selected from the group consisting of 12-hydroxystearamide wax, N-(2-hydroxy ethyl) 12-hydroxystearamide and stearamide.

20. The hot melt adhesive of claim 19 additionally containing present up to 10% by weight a less polar wax selected from the group consisting of N,N'-ethylene-bis-stearamide, hydrogenated castor oil, oxidized synthetic waxes, and functionalized synthetic wax.

21. The hot melt adhesive of claim 1 wherein the nonionic plasticizer is a polar plasticizer selected from the group consisting of phthalate plasticizers, benzoate plasticizers, aliphatic liquid polyesters, phosphate plasticizers, poly (ethylene glycol) with number average molecular weight below about 1000; ethoxylates of phenol, bisphenol A or mono or di-alkylated phenol, liquid rosin derivatives having Ring and Ball melting points below about 60° C., and vegetable and animal oils.

22. The hot melt adhesive of claim 21 wherein the nonionic plasticizer is selected from the group consisting of the mono-phenyl ether of polyethylene-glycol; butyl benzyl phthalate; diethylene glycol/dipropylene glycol dibenzoate, and diethylene glycol dibenzoate where the mole fraction of hydroxyl groups which have been esterified ranges from 0.5 to 0.95.

23. A remoistenable envelope comprising a hot melt adhesive according to claim 1.

* * * * *